United States Patent [19]

Fennel et al.

[11] Patent Number: 5,895,434
[45] Date of Patent: Apr. 20, 1999

[54] MICROPROCESSOR ARRANGEMENT FOR A VEHICLE CONTROL SYSTEM

[75] Inventors: Helmut Fennel, Bad Soden; Bernhard Kant, Hochheim; Hermann Esselbrugge, Weiterstadt; Michael Zydek, Langgons; Bernhard Giers, RoBdorf, all of Germany

[73] Assignee: ITT Manufacturing Enterprises Inc., Wilmington, Del.

[21] Appl. No.: 08/817,837

[22] PCT Filed: Oct. 30, 1995

[86] PCT No.: PCT/EP95/04262

§ 371 Date: Jul. 11, 1997

§ 102(e) Date: Jul. 11, 1997

[87] PCT Pub. No.: WO96/14226

PCT Pub. Date: May 17, 1996

[30] Foreign Application Priority Data

Nov. 2, 1994 [DE] Germany ............... 44 39 060

[51] Int. Cl.[6] .................................................. G06G 7/76
[52] U.S. Cl. .................................................. 701/48; 701/36
[58] Field of Search ................................ 701/48, 36, 69, 701/70, 71, 78, 76, 74, 84, 83; 303/150, 165, 168, 140, 186, 189, 162, 122.11; 395/182.09, 182.11

[56] References Cited

U.S. PATENT DOCUMENTS 4,629,259 12/1986 Brauninger .......................... 701/74
4,656,588 4/1987 Kubo ................................. 701/76
5,001,641 3/1991 Makino .............................. 701/76
5,053,950 10/1991 Naganuma et al. ................ 395/675
5,193,887 3/1993 Bleckmann et al. ............... 701/76
5,241,677 8/1993 Naganuma et al. ................ 395/675
5,255,962 10/1993 Neuhaus et al. ................... 701/76
5,684,702 11/1997 Phillips et al. ..................... 701/76
5,694,321 12/1997 Eckeret et al. ..................... 701/84
5,697,681 12/1997 Ghaem et al. ..................... 303/168

FOREIGN PATENT DOCUMENTS 3234637   3/1984  Germany .
4137124   5/1993  Germany .
WO9117069 11/1991  WIPO .
WO9301075  1/1993  WIPO .
WO9614556  5/1996  WIPO .

*Primary Examiner*—Jacques H. Louis-Jacques
*Attorney, Agent, or Firm*—Rader, Fishman & Grauer PLLC

[57] ABSTRACT

The present invention relates to a microprocessor arrangement for use in a vehicle control system which includes a plurality of microprocessor systems that are linked by bus systems and perform at least anti-lock control (ABS) and/or traction slip control (ASR) and at least one other high-computation control function, such as yaw torque control (GMR), and monitoring functions. The microprocessor arrangement includes three microprocessor systems to which the individual functions are allocated so that the first microprocessor system along with the second microprocessor system performs the ABS and ASR functions, including the monitoring of these functions, and that the third microprocessor system along with the second microprocessor system performs the other control function (GMR), including its monitoring.

30 Claims, 2 Drawing Sheets

MICROPROCESSOR ARRANGEMENT FOR A VEHICLE CONTROL SYSTEM

BACKGROUND OF THE INVENTION

The present invention relates to a microprocessor arrangement for use in a complex vehicle control system which includes a plurality of microprocessor systems that are linked by bus systems and perform at least anti-lock control (ABS) and/or traction slip control (ASR) and at least one other high-computation control function, such as yaw torque control (GMR), and monitoring functions, the microprocessor systems including the conditioning of input signals.

Electronic control systems for automotive vehicles become more and more important which relieve the work of the driver and enhance safety and driving stability. This applies, above all, to anti-lock systems (ABS), traction slip control systems (ASR), systems for the electronic control of brake force distribution (EBV), etc. Most recent developments include yaw torque control and driving stability control (GMR and FSR). These are only some examples. Combining a plurality of control systems in a compound unit is also known in the art.

To achieve complex control objectives, microprocessor structures of most different types are employed nowadays. For example, German patent No. 32 34 637 discloses an ABS system with a controller which has two (or more) parallel operating microcontrollers to produce braking pressure control signals. These microcontrollers process like input signals pursuant to an identical computer program. The output signals and, if necessary, also internal signals of the microcontrollers are monitored for coincidence to detect malfunctions in any one of the two controllers. In the event of non-coincidence of the signals which are redundantly processed in the microcontrollers, the electronic control is disconnected to ensure that at least braking without control remains possible.

Further, German patent application No. 41 37 124 discloses a circuit arrangement of this type which has a so-called asymmetrical redundance. The input signals, i.e. the signals produced by wheel sensors and representing the rotational behavior of the wheels, are sent to two parallel microcontrollers, as in the above-mentioned case. However, only one of the two microcontrollers performs the complete control program, while the second microcontroller reproduces the control philosophy in a simplified form or, rather, processes the input signals by way of simplified algorithms, as compared to the main microcontroller. Comparison of the output signals of both microcontrollers will then permit identifying, despite the simplified processing in one of the two microcontrollers, whether data processing is faulty or correct.

When an automotive vehicle control system, for example an ABS/ASR system, is extended by a high-computation driving stability control system (FSR or GMR), it is principally possible to additionally install a complete control system which also includes safety functions. The advantage is that the individual components, i.e., both the previous ABS/ASR system and the driving stability control system, are independent of each other, and that only the affected component will fail when defects or malfunctions occur.

It would, principally, also be possible in a basic structure (ABS/ASR) that is extended by driving stability control to include the additional calculating operations, including the monitoring functions, in the processor structure when microprocessor systems of a sufficient capacity are provided. However, there is the shortcoming that the overall system would have to be disconnected when a defect occurs in one component. Because an overall system of this type is comparatively complex and sophisticated, the occurrence of malfunctions is relatively likely.

SUMMARY OF THE INVENTION

An object of the present invention is to develop a microprocessor arrangement for a complex vehicle control system which includes ABS/ASR and GMR (FSR), for example, which involves great reliability in operation and relatively low effort and structure and necessitates disconnection of the affected component only when an error occurs.

It has been found that this object can be achieved according to claim 1 by a microprocessor arrangement of the type initially referred to which provides as special features the inclusion of three microprocessor systems, the individual functions being allocated so that the first microprocessor system along with the second microprocessor system performs the ABS and/or ASR functions, including the monitoring of these functions, by at least partly redundant signal or data processing operations and deactivation of the control when redundance troubles occur, and that the third microprocessor system along with the second microprocessor system performs the other control function, including the monitoring of the other control function.

The microprocessor arrangement according to the present invention is based on a previous ABS/ASR structure, including the monitoring operation by redundant signal processing, and permits the inclusion of e.g. a high-computation complex yaw torque control or driving stability control by using only one further microprocessor system. A very high degree of reliability in operation applies also to driving stability control because redundant or partly redundant processing of the driving stability control data is effected by way of the second microprocessor arrangement which mainly performs the ABS/ASR functions. Upon detection of a malfunction in the driving stability control component, the ABS/ASR function may be continued without impairment of the reliability in operation.

Some particularly preferred aspects of the present invention are described in the subclaims. Thus, it if favorable in some cases to perform the conditioning of the input signals required for anti-lock control and/or traction slip control, in particular the relatively complicated conditioning of wheel speed signals, in the first microprocessor system. The input signals which are additionally required for the other control function may also be conditioned in the first system. However, these signals are suitably conditioned in the second and/or the third microprocessor system.

The data processing for the control functions can be performed in the first and second microprocessor systems pursuant to the same program and simultaneously. With the operation intact, the results of both systems must be in full coincidence. According to another aspect of the present invention, however, it is also possible and especially appropriate to design the microprocessor arrangement so that the data processing in the first microprocessor system, compared to the data processing in the second system, is performed according to a simplified control algorithm which only reproduces the control algorithm in the second microprocessor system, namely in such a way that faulty operation of one of the two systems is identifiable by comparison of the results of data processing of the first microprocessor system with the results of the second microprocessor system.

To monitor the control function incorporated in the third microprocessor system, for example, yaw torque control, it is suitable to provide the associated signal or data processing redundantly in the second microprocessor system, either in an identical manner, or in a simplified or reproduced form.

In another aspect of the present invention, an algorithm which is simplified compared to the data processing in the third system is run in the second microprocessor system to monitor the other control function so that, again, errors can be identified by comparison of the results.

In another preferred aspect of the present invention, the microprocessor arrangement is designed so that the ABS/ASR functions are continued even if the monitoring of the other control function identifies a fail condition and deactivates the other control function.

Appropriately, the three microprocessor systems of the microprocessor arrangement of the present invention are interconnected by a ring bus, and each microprocessor system includes a writable and readable shift register, and the data are transmitted and/or exchanged constantly in an invariably predetermined sequence or by a software protocol. It is of course also possible and favorable in some cases to effect the data transfer between the three microprocessor systems by way of parallel bus systems or in a star-type manner.

Further, it is advantageous to incorporate in the first microprocessor system, which performs the ABS and ASR functions, an EBV function (EBV=electronic control of brake force distribution) and, if necessary, also the required electronic system or program structure for a brake assistant function (BA function). The required information is also produced by way of wheel sensors and additional sensors, for example, a pedal actuation sensor required for the brake assistant.

Finally, in one preferred design of the microprocessor arrangement of the present invention, the individual functions are allocated to the three microprocessor systems so that in the first microprocessor system at least the input signals are conditioned which are required for ABS and/or ASR functions, that in the second microprocessor system the control functions (ABS, ASR, GMR) are performed, and that the monitoring of at least the ABS and/or ASR functions takes place in the first microprocessor system and the monitoring of the other control function takes place in the third microprocessor system (MP3.4). To monitor the control functions, the input data are processed pursuant to an algorithm which is simplified as compared to the complete data processing, the results of the complete data processing are compared with the results of the simplified data processing, and the control is partly or entirely deactivated or modified upon the occurrence of discrepancies.

It is advisable, in particular in the last mentioned embodiment, to additionally incorporate diagnosis functions or service functions in the first and/or third microprocessor system.

Further details of the present invention can be seen in the following description of embodiments, making reference to the accompanying drawings.

DETAILED DESCRIPTION OF THE INVENTION

The microprocessor arrangements of the present invention basically include three microprocessor systems MP1, MP2, MP3 which are interconnected by a bus system. A ring bus is provided in the embodiments of FIGS. 1 and 3, and a star-type bus is provided in the embodiments of FIGS. 2 and 4. Appropriately, the data are constantly transmitted and exchanged by way of writable and readable shift registers, which are components of the microprocessor systems MP1, MP2, MP3, in an invariably predetermined sequence or by a software protocol. The present case relates to microprocessor arrangements for an automotive vehicle control system which, as can be seen in FIG. 5, comprises anti-lock control (ABS), traction slip control (ASR) and yaw torque control (GMR) and may, therefore, also be used for driving stability control. An electronic control of brake force distribution (EBV) is also provided. The sophisticated conditioning of the input signals, in particular the wheel sensor signals, is referred to by SC (Signal Conditioning).

The control functions for ABS, ASR, and EBV are principally combined in the same microprocessor system and referred to by "ABS" in FIGS. 1 to 4 for the sake of simplicity. Small letters "abs", or "abs/asr/ebv" and "gmr" in the FIGS. 1 to 5 represent the calculating operations which, compared to the functions or data processing operations designated by capital letters "ABS/ASR/EBV" or "GMR", run pursuant to a simplified algorithm and are used only for checking or monitoring the complete data processing operations (ABS/ASR/EBV and GMR).

The data are principally processed redundantly or "partly redundantly" in two microprocessor systems by way of the microprocessor arrangements according to the present invention. "Partly redundant" refers to the processing operation pursuant to the simplified algorithm which reproduces the control functions. The calculations with the simplified algorithm are represented by small letters. The function of the microprocessor systems is monitored in the microprocessor arrangements of the present invention in a known fashion by comparing the results achieved by complete redundance or partial redundance.

Figure 1:
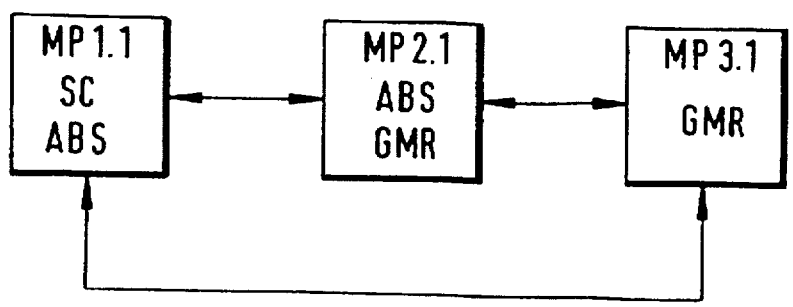
FIGS. 1 to 4 are schematic views of alternative embodiments of microprocessor arrangements of the present invention, the functions being differently allocated to the individual microprocessor systems.

The microprocessor arrangement of FIG. 1 is based on the redundant calculation of all functions. The ABS/ASR/EBV functions are calculated in the microprocessor systems MP1.1 and MP2.1 and the GMR functions are calculated in the microprocessor systems MP2.1 and MP3.1 according to the same algorithms. This type of redundant calculation is referred to as "symmetrical redundance". The signal conditioning SC, at least the conditioning of the wheel sensor signals, is also incorporated in the microprocessor system MP1.1.

Figure 2:
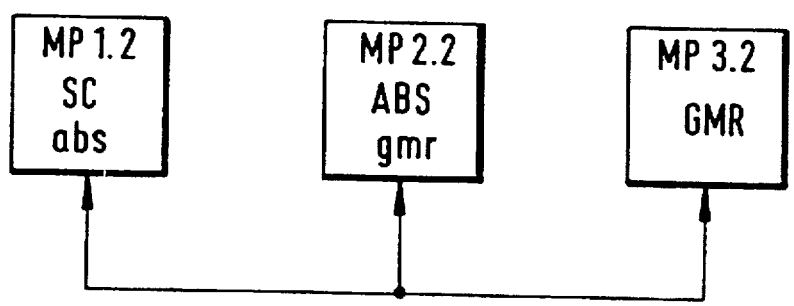

In the embodiment of FIG. 2, both the ABS functions (as explained before: including ASR and EBV) and the GMR functions are monitored by comparing the results of the complete calculations in the microprocessor systems MP2.2 and MP3.2 with the results of the simplified data processing (ABS or GMR). This type of monitoring operation is referred to as "asymmetrical redundance".

Figure 3:
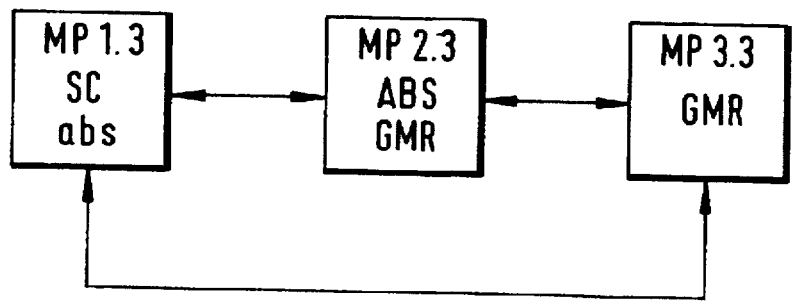

In the embodiment of FIG. 3, the symmetrical redundance is used in the calculation and monitoring of the GMR functions, and the asymmetrical redundance is used with respect to the ABS functions.

Figure 4:
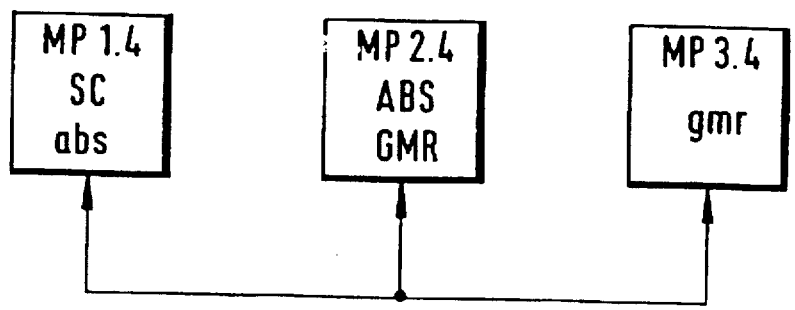
Figure 5:
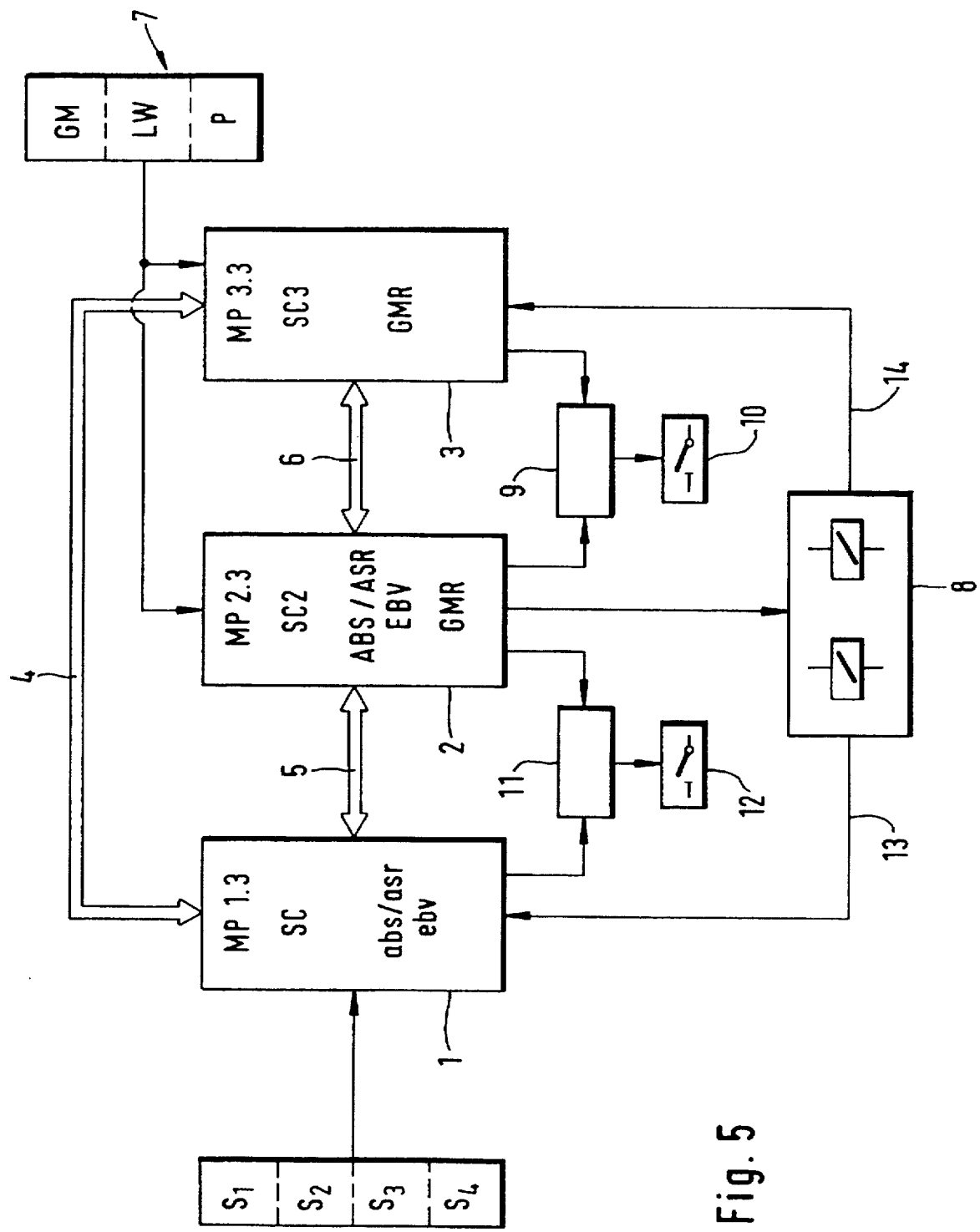
FIG. 5 is a schematically simplified view of further details of the embodiment of FIG. 3.

FIG. 4 differs from the embodiment of FIG. 2 in that both the ABS functions and the GMR functions are incorporated in a microprocessor system MP2.4. The other two microprocessor systems MP1.4 and MP3.4 make use of the data simplification pursuant to the simplified algorithms. Therefore, microprocessor systems of a simpler design are sufficient in this respect, or space for additional diagnosis and/or service functions is left.

The design and operation of a microprocessor arrangement according to the present invention will be explained in detail by way of FIG. 5. This example is based on the same allocation of functions as in the embodiment of FIG. 3.

The microprocessor systems 1, 2, 3 (MP1.3, MP2.3, MP3.3) are interconnected by a ring bus 4, 5, 6. Signals representative of the rotational behavior of the individual vehicle wheels are produced by wheel sensors $S_1$ to $S_4$. These data are required for all control systems (ABS, ASR, EBV, GMR). Additional data and control quantities, which are necessary above all for yaw torque control (GMR), are produced by way of another sensor unit 7 comprising, for example, a steering angle sensor LW, a yaw torque sensor GM or transverse acceleration sensor, pressure sensors P, etc., depending on the respective type of design and the requirements to be met by the control system. At least some of the data procured by the sensor unit 7 are also of benefit to improve and/or monitor the other control systems ABS/ASR/EBV.

In the embodiment of FIG. 5, the first microprocessor system 1 (MP1.3) accommodates a signal conditioning system SC for the wheel sensor signals. The conditioning of the signals supplied by the sensor unit 7 is effected in corresponding program or hardware structures SC2, SC3 of the microprocessor systems 2 and 3 in the embodiment of FIG. 5.

In the present embodiment, the second microprocessor system 2 (MP2.3) accommodates the data processing system for the anti-lock control system (ABS), including traction slip control (ASR) and the electronic control of brake force distribution (EBV), and the data processing for yaw torque control (GMR). Braking pressure control signals are calculated in the microprocessor system 2 as a function of the sensor signals provided by the wheel sensors $S_1$ to $S_4$ and by the sensor unit 7. The braking pressure control signals actuate in a known fashion hydraulic valves, pressure modulators, hydraulic pumps, etc., represented by a hydraulic unit 8 in FIG. 5. The hydraulic unit 8 comprises all components for the adjustment and modulation of the braking pressure in the individual wheel brakes of a vehicle.

The calculations required for yaw torque control (GMR) and driving stability control are also performed in the third microprocessor system 3. Consequently, the function of the yaw torque control may be monitored by comparing the data which are redundantly processed in the systems 2 and 3. In the event of differences, an error indication is triggered by way of a redundance element 9 which compares the GMR output signals of the microprocessor systems 2 and 3. If necessary, a switch 10 will also be actuated to deactivate the control temporarily or until the error is eliminated.

Contrary to the illustration in FIG. 5 which is simplified for better understanding the operation, the redundance element 9 is also of a redundant design and realized by software, i.e., by correspondingly programming the microprocessors. In fact, a comparison of the output signals or of the processes occurring in the processors is effected in the microprocessor system 2 as well as in the system 3, as is disclosed in the above mentioned German patent No. 32 34 637, for example. The switch 10 in FIG. 5 also represents a redundant disconnecting system which includes two switches or two switch functions.

A second redundance element 11 compares the ABS/ASR/EBV signals with the abs/asr/ebv signals produced on the basis of simplified algorithms. When differences from this asymmetrical redundance occur, this indicates an error which, in turn, causes deactivation of the control by way of a switch 12.

The redundance element 11 as well as the redundance element 9 is appropriately realized by software or programming. Signal comparisons independent of each other are carried out in the microprocessor system 1 and the microprocessor system 2. The deactivation of the system by switch 12 also has a redundant design. Redundance elements 11 and 9 and switches 12 and 10 are provided according to the same redundance principle.

In the arrangement of FIG. 5, the actuation and the switch condition of the valves (which are indicated symbolically in the hydraulic unit 8) is fed back, by way of signal lines 13, 14, to the microprocessor system 1 (MP1.3) and the microprocessor system 3 (MP3.3) which includes the GMR function. A check is made whether the respective valve functions are coincident with the calculations in the system 3 or with the simplified calculation in the system 1.

A significant advantage of the microprocessor arrangement of the present invention involves that, on the one hand, only relatively low expenditure is incurred, i.e. relatively few microprocessor systems and comparatively modest calculating equipment is required to achieve the control operations described, in particular ABS, ASR, EBV, and GMR control, including the redundant or partly redundant calculating operations which are necessary for monitoring. On the other hand, the control systems are relatively independent of one another. This fact permits, for example when an error function is identified in the GMR system, deactivating only this system branch or limiting it to an uncritical function, while the function of the other control systems (ABS/ASR/EBV, etc.) is maintained. It will easily be understood that the result is a considerably higher level of safety.

We claim:

1. A microprocessor arrangement for use in a vehicle control system comprising:

a plurality of microprocessor systems that are linked by bus systems and perform at least one function out of an anti-lock control function and traction slip control function and at least one high-computation control function, such as yaw torque control function, and monitoring functions, the microprocessor systems including the conditioning of input signals, wherein three microprocessor systems are provided such that the individual functions are allocated to the three microprocessor systems so that a first microprocessor system along with a second microprocessor system performs at least one out of the anti-lock control function and traction slip control function, including the monitoring of these functions, by at least a partly redundant signal or data processing operations and deactivation of the control if redundance troubles occur, wherein the third microprocessor system along with the second microprocessor system performs the other control function out of the anti-lock control function and the traction slip control function, including the monitoring of the other control function; and wherein the data processing in the first microprocessor system, compared to the data processing in the second microprocessor system, is performed according to a simplified control algorithm which reproduces the control algorithm of the control functions performed in the second microprocessor system, namely in such a way

7 that faulty operation of the first or the second microprocessor system is identifiable by comparison of the results of data processing of the first microprocessor system with the results of the second microprocessor system.

2. The microprocessor arrangement as claimed in claim 1, wherein the first microprocessor system along with the second microprocessor system additionally performs an electronic control of brake force distribution.

3. The microprocessor arrangement as claimed in claim 1, wherein the first microprocessor system along with the second microprocessor system additionally performs a brake assisting function.

4. The microprocessor arrangement as claimed in claim 1, wherein the conditioning of at least the input signals required for one of the anti-lock control function and traction slip control function, and in particular the conditioning of wheel speed signals, is effected in the first microprocessor system.

5. The microprocessor arrangement as claimed in claim 4, wherein the conditioning of the input signals which are additionally required for the other control function is effected in at least one out of the second and the third microprocessor system.

6. The microprocessor arrangement as claimed in claim 1, wherein the data processing for the control functions is performed in the first and second microprocessor systems pursuant to the same program.

7. The microprocessor arrangement as claimed in claim 1, wherein the monitoring of the other control function is performed by redundant signal or data processing in the second and the third microprocessor system.

8. The microprocessor arrangement as claimed in claim 1, wherein the at least one out of the two functions anti-lock control and traction slip control are continued when the monitoring of the other control function identifies a fail condition.

9. The microprocessor arrangement as claimed in claim 1, wherein the three microprocessor are interconnected by a ring bus, in that each microprocessor system includes a writable and readable shift register, and in that the data are transmitted constantly.

10. The microprocessor arrangement as claimed in claim 1, wherein at least one out of the two functions diagnosis and service is additionally provided in at least one out of the first and the third microprocessor system.

11. A microprocessor arrangement for use in a vehicle control system comprising:

a plurality of microprocessor systems that are linked by bus systems and perform at least one function out of an anti-lock control function and traction slip control function and at least one high-computation control function, such as yaw torque control function, and monitoring functions, the microprocessor systems including the conditioning of input signals, wherein three microprocessor systems are provided such that the individual functions are allocated to the three microprocessor systems so that a first microprocessor system along with a second microprocessor system performs at least one out of the anti-lock control function and traction slip control function, including the monitoring of these functions, by at least a partly redundant signal or data processing operations and deactivation of the control if redundance troubles occur, wherein the third microprocessor system along with the second microprocessor system performs the other control function out of the anti-lock control function and the traction slip control function, including the monitoring of the other control function; and wherein the data processing, which is installed in the second microprocessor system and used to monitor the other control function, is performed in a simplified algorithm, which reproduces the control algorithm of the third microprocessor system, namely in such a way that errors can be identified by comparison of the results of the data processing of the third microprocessor system with the results of the data processing by way of the simplified, reproducing algorithm in the second microprocessor system.

12. The microprocessor arrangement as claimed in claim 11, wherein the first microprocessor system along with the second microprocessor system additionally performs an electronic control of brake force distribution.

13. The microprocessor arrangement as claimed in claim 11, wherein the first microprocessor system along with the second microprocessor system additionally performs a brake assisting function.

14. The microprocessor arrangement as claimed in claim 11, wherein the conditioning of at least the input signals required for one function out of anti-lock control and traction slip control, in particular the conditioning of wheel speed signals, is effected in the first microprocessor system.

15. The microprocessor arrangement as claimed in claim 14, wherein the conditioning of the input signals which are additionally required for the other control function is effected in at least one out of the second and the third microprocessor system.

16. The microprocessor arrangement as claimed in claim 11, wherein the data processing for the control functions is performed in the first and second microprocessor systems pursuant to the same program.

17. The microprocessor arrangement as claimed in claim 11, wherein the monitoring of the other control function is performed by redundant signal or data processing in the second and the third microprocessor system.

18. The microprocessor arrangement as claimed in claim 11, wherein the at least one out of the two functions anti-lock control and traction slip control are continued when the monitoring of the other control function identifies a fail condition.

19. The microprocessor arrangement as claimed in claim 11, wherein the three microprocessor are interconnected by a ring bus, in that each microprocessor system includes a writable and readable shift register, and in that the data are transmitted constantly.

20. The microprocessor arrangement as claimed in claim 11, wherein at least one out of the two functions diagnosis and service is additionally provided in at least one out of the first and the third microprocessor system.

21. A microprocessor arrangement for use in a vehicle control system comprising:

a plurality of microprocessor systems that are linked by bus systems and perform at least one function out of an anti-lock control function and traction slip control function and at least one high-computation control function, such as yaw torque control function, and monitoring functions, the microprocessor systems including the conditioning of input signals, wherein three microprocessor systems are provided such that the individual functions are allocated to the three microprocessor systems so that a first microprocessor system along with a second microprocessor system performs at least one out of the anti-lock control function and traction slip control function, including the monitoring of these functions, by at least a partly redundant signal or data processing operations and deactivation of the control if redundance troubles occur, wherein the third microprocessor system along with the second microprocessor system performs the other control function out of the anti-lock control function and the traction slip control function, including the monitoring of the other control function; and wherein the individual functions are allocated to the three microprocessor systems so that in the first microprocessor system at least the input signals are conditioned which are required for at least one out of the two functions anti-lock control and traction slip control, that in the second microprocessor system the control functions are performed, and that the monitoring of at least one out of the two functions anti-lock control and traction slip control takes place in the first microprocessor system, and the monitoring of the other control function takes place in the third microprocessor system, wherein to monitor the control functions, the input data are processed pursuant to an algorithm which is simplified as compared to the complete data processing and reproduces the control functions, the results of the complete data processing are compared with the results of the simplified data processing, and the control is partly or entirely deactivated or modified upon the occurrence of discrepancies.

22. The microprocessor arrangement as claimed in claim 21, wherein the first microprocessor system along with the second microprocessor system additionally performs an electronic control of brake force distribution.

23. The microprocessor arrangement as claimed in claim 21, wherein the first microprocessor system along with the second microprocessor system additionally performs a brake assisting function.

24. The microprocessor arrangement as claimed in claim 21, wherein the conditioning of at least the input signals required for one function out of anti-lock control and traction slip control, in particular the conditioning of wheel speed signals, is effected in the first microprocessor system.

25. The microprocessor arrangement as claimed in claim 24, wherein the conditioning of the input signals which are additionally required for the other control function is effected in at least one out of the second and the third microprocessor system.

26. The microprocessor arrangement as claimed in claim 21, wherein the data processing for the control functions is performed in the first and second microprocessor systems pursuant to the same program.

27. The microprocessor arrangement as claimed in claim 21, wherein the monitoring of the other control function is performed by redundant signal or data processing in the second and the third microprocessor system.

28. The microprocessor arrangement as claimed in claim 21, wherein the at least one out of the two functions anti-lock control and traction slip control are continued when the monitoring of the other control function identifies a fail condition.

29. The microprocessor arrangement as claimed in claim 21, wherein the three microprocessor are interconnected by a ring bus, in that each microprocessor system includes a writable and readable shift register, and in that the data are transmitted constantly.

30. The microprocessor arrangement as claimed in claim 21, wherein at least one out of the two functions diagnosis and service is additionally provided in at least one out of the first and the third microprocessor system.

* * * * *